UNITED STATES PATENT OFFICE.

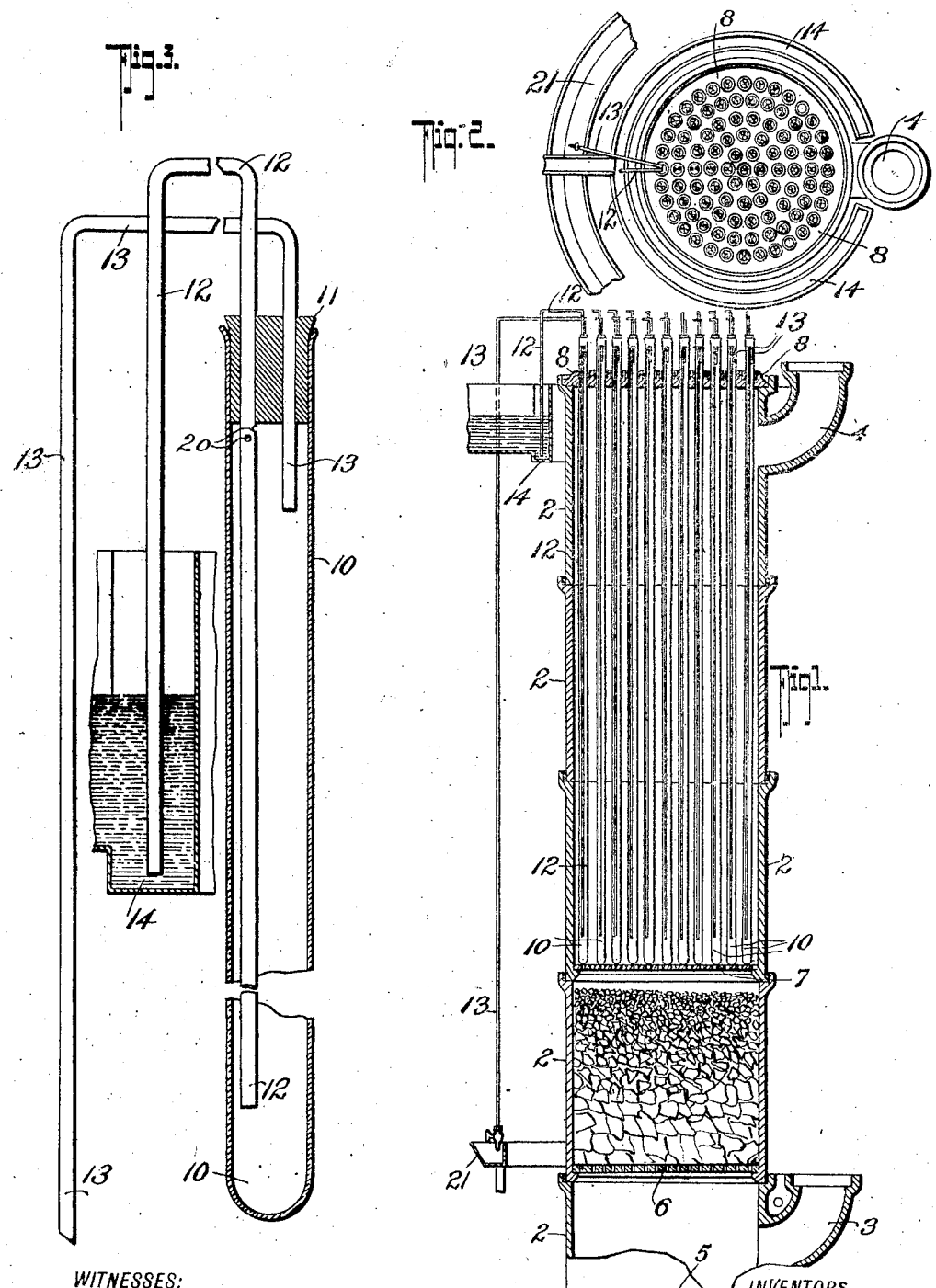

FREDERICK MOORE AND JOHN A. HALL, OF VICTORIA, BRITISH COLUMBIA, CANADA.

ACID-CONDENSER.

986,846.

Specification of Letters Patent.  Patented Mar. 14, 1911.

Application filed April 13, 1910. Serial No. 555,173.

*To all whom it may concern:*

Be it known that we, FREDERICK MOORE and JOHN A. HALL, citizens of the Dominion of Canada, residing at Victoria, in the Province of British Columbia, Canada, have invented a new and useful Acid-Condenser, of which the following is a specification.

This invention relates to a condenser for acid vapor which though particularly designed for the condensation of nitric acid may be applicable for use with other acids where similar requirements prevail.

The condenser comprises certain novel and advantageous features whereby the vapors of the nitric acid are not only economically condensed but owing to the particular arrangement of and provision in the condenser, the obtained acid is free from oxids. These oxids are commonly present in nitric acid as condensed by the usual methods, and as their presence depreciates the commercial value of the acid their removal is frequently the subject of subsequent elaborate process of treatment.

Generally described the condenser consists primarily of a chamber through which the vapor of the acid to be condensed is upwardly passed among a series of tubes within each of which a cooling medium is circulated. The acid condenses on the outside of the tubes and trickling down them is brought in contact with the incoming acid vapor by which means the temperature of the condensed acid is sustained and the absorption of oxids is therefore avoided. This advantageous condition is further developed by dividing off from the lower end of the condensing chamber by means of perforated plates a section which is charged with broken pumice or the like substance through which the condensed acid may percolate downward to the outlet while the incoming vapor rises through the interstices of the pumice, in intimate contact with the finely divided acid;
so that practically the acid leaves the condenser at a temperature only slightly below its boiling point.

The invention also comprises the means whereby the cooling medium is circulated through the condensing tubes with a flow that is restricted in comparison with the cooling area exposed.

The invention is particularly described in the following specification, reference being made to the drawings by which it is accompanied, in which:

Figure 1 is a vertical section through the condenser, one of the condensing tube siphons only being shown complete, Fig. 2 is a plan of the same, and Fig. 3, an enlarged detail of the condensing tube siphon.

In these drawings 2 represents a condenser vessel of earthenware or other suitable material that will resist the action of the acid. This vessel is preferably made up of a series of short lengths of earthenware pipes socketed together and having their joints sealed with asbestos putty or the like. The lower end of the vessel 2 is closed and is provided with a branch connection 3 through which the vapor to be condensed is delivered from the nitric acid pot or other source from which the vapor is derived which it is desired to condense. Toward the upper end of the vessel 2 is a similar branch 4 for delivery of the non-condensed gas for such further treatment as it may require. At the bottom of the vessel 2 is an outlet 5 from which the condensed acid is delivered which outlet may be furnished with a ground earthenware stop-cock.

Supported in any convenient manner a short distance above the vapor inlet 3 is a perforated grid 6 of acid resisting material on which broken pumice stone or other suitable substance is loosely packed, the same being graded from the coarser material at the bottom to the finer at the top. Just above this charge of pumice is a second perforated grid 7 on which rest the lower ends of condensing tubes 10 of glass or other suitable material which pass through an apertured plate 8 in the top of the vessel 2. The tubes 10 are sealed in this top plate 8 and the plate itself in the top of the vessel with asbestoes putty or the like, the apertures being chambered to receive and retain it. These condensing tubes 10 are approximately one inch in internal diameter and have a thickness of one sixteenth of an inch. Their lower ends are sealed and the upper ends are closed with stoppers 11 through which pass two glass tubes 12 and 13 about one quarter of an inch in diameter. The tube 12 of each extends from near the bottom of the tube 10 and passing through the stopper 11 is turned downward and is dipped into a trough 14 extending around the vessel 2 in which trough water or any other suitable cooling liquid is maintained at a constant level by any approved device such as a float closed valve. Each tube 12 is provided within its tube 10 with a small aperture or apertures 20 just below the level of the closing plug 11 through which it passes the reason for which will be explained later.

The tube 13 is carried from the upper end of the tube 10 through the stopper 11 and outside of it is also turned downward and delivers at such a level in relation to that in the trough that with the plug 12 connected to it by 10, it will form a siphon to draw the cooling fluid from the trough and circulate it in the condensing tube 10. With the object of having a sufficient circulation the tube 13 is carried below the level of the lower end of 10 and delivers into a trough 21 for delivery to a drain. To afford a means for regulating the circulation, each tube 13 may be furnished with a small stop-cock. The cooling medium may be circulated by constant pressure if thought desirable without departing from the spirit of the invention.

In use all of the combined tubes 10, 12 and 13 are filled with water or with the cooling medium in any convenient manner, either by suction through the tube 13 or by delivering the liquid under pressure through them. When the air in 10 is displaced by the liquid each tube 12 and 13 acts as a siphon the weight of the liquid in the longer leg of 13 drawing the liquid from the trough 14 through the tube 12 and from the manner of connection within the tube 10 circulating it within that tube. The liquid, warmed in condensing the acid, will be drawn from the top of 10 through 13 and replaced by that drawn in through 12 from the trough 14 and delivered at the bottom of 10. The larger tube 10 is merely an enlarged connection of the siphoning tubes 12 and 13 offering an ample cooling surface within the condenser with a restricted circulation of the cooling medium limited to what can siphon through the smaller tubes 12 and 13 and susceptible of being regulated beneath that amount by the small stop-cock on the lower end of 13. This medium may consist of either water or preferably a solution of calcium chlorid or of glycerin or other material having a low freezing temperature. The nitric acid vapor delivering at 3 will pass through the perforated plates 6 and the broken pumice on it and will pass upward among the condensing tubes 10 to condense on their surfaces. The condensed acid trickling down the outside of the tubes 10 will pass through the grid 7 and will percolate through the pumice where in a finely divided state it will come intimately into contact with the incoming vapor the heat of which will sustain that of the condensed acid and will thus prevent the absorption of oxids. The acid after passing through the pumice is delivered through the stop-cock at 5.

The small vents 20 in each tube 12 just within the stopper 11 of the tube 10 are designed to stop siphoning action of the tube 12 in the event of the condensing tube 10 being broken. With which provision in the event of the tube 10 being broken the contents of that particular tube 10 may be spilled into the acid but the tube 12 will not continue to siphon the cooling liquid from the trough 14, and the vents will not materially interfere with the action of 12 in delivering the incoming water to the bottom of the tube 10.

The condenser thus constructed and used forms a most efficient one for the purpose designed, for, as explained, the acid as it leaves the condenser need only be slightly below its boiling point, at which temperature it will not readily absorb oxids. Further the joints of the condensing tubes where they pass through the end plate are at the cooler end of the chamber and are not exposed to the heat of the incoming acid vapor which might be detrimental to them in causing them to leak, and it is essential in the condensation of the nitric acid that all joints be maintained as tight as possible.

The non-condensed vapor passing off at 4 may be delivered to a second similar condenser but which will not require to be furnished with the pumice screen, as the acid condensed in it may be delivered through a central tube hole in the top end plate 8 of the first condenser and will pass through the pumice of it and derive the advantage consequent thereon. The cooling fluid may also deliver from 21 of the second condenser into the trough 14 of the first. The association of the secondary condensers forms, however, no part of the invention as it is merely a multiplication of it.

We claim—

1. An acid condenser, comprising in combination, a vertically elongated chamber having a passage toward the bottom through which the vapor of the acid to be condensed is delivered, a perforated distributing plate across the chamber above the vapor inlet, condensing tubes arranged within the chamber in the space above the distributing plate, means for circulating a cooling medium within said tubes, means for withdrawing the condensed acid from the bottom of the chamber, and means for delivering the non-condensed vapor from the upper end of the chamber.

2. An acid condenser, comprising in combination, a vertically elongated chamber having a passage toward the bottom through which the vapor of the acid to be condensed is delivered to the condenser, a perforated distributing plate across the chamber above the vapor inlet on which plate broken pumice or the like is arranged, a second perforated distributing plate a short distance above the first named plate, a series of condensing tubes lengthwise arranged within the chamber above the second distributing plate, means for circulating a cooling medium within these tubes, means for withdrawing the condensed acid from beneath the lower distributing plate and means for delivering from the condenser the non-condensed acid vapor.

3. An acid condenser, comprising the combination with a chamber into which the vapor to be condensed is delivered, of a series of condensing tubes each closed at the lower end and having the upper end projecting through and sealed in the upper end of the condensing chamber, a trough adjacent to the upper end of the condensing chamber within which a cooling medium is maintained at a constant level, a siphon tube from said trough through the stoppered end of the condenser tube and delivering to its lower end, a siphon tube from the upper end of the condensing tube and delivering through the stopper to a drain trough outside of the condenser the outside leg of the siphon terminating below the level of the bottom of the condensing tube, and means for varying the flow through the siphon.

4. In an acid condenser having a series of tubes within which a cooling medium is circulated and to the space surrounding which the vapor to be condensed is delivered, means whereby the delivery of the cooling medium to any condensing tube ceases in the event of the condensing tube being fractured.

5. In an acid condenser, a vertically elongated chamber composed of a series of pipe sections secured together, end for end, a receptacle secured to the lower pipe section, said receptacle having an inlet, a pair of perforated diaphragms carried in the lower end of said chamber and spaced apart, broken acid proof substance held in said chamber between said diaphragms, a cap for closing the upper end of said chamber, a set of condensing tubes carried by said cap and projecting into said chamber and resting on the upper one of said diaphragms, means for delivering a cooling fluid into said condensing tubes and withdrawing said fluid from said condensing tubes to effect a circulation, said chamber having an outlet near its upper end, and said receptacle having an outlet through which condensed acid may be withdrawn.

6. In a condensing apparatus, a condensing tube closed at one end, a stopper for closing the other end of said tube, an intake tube projecting through said stopper and terminating adjacent to the bottom of said condensing tube, said intake tube having an aperture adjacent to said stopper, an offtake tube projecting through said stopper into said condensing tube with its inner end terminating below said aperture, the outer ends of said intake and offtake tubes being in different horizontal planes to form a siphon.

7. In an acid condenser, an elongated vessel having a closed bottom, a diaphragm mounted in said vessel above said bottom, a second diaphragm mounted in said vessel above said first diaphragm, a condensing and distributing substance in the space between said diaphragms, a cover for said vessel, a set of condensing tubes carried by said cover, said condensing tubes each having a closed end to rest on the second mentioned diaphragm and having an open end projected above said cover, a stopper for the open end of each tube, a fluid intake tube projected through said stopper, and a fluid offtake tube projected through said stopper, and means for causing a circulation of fluid through said intake and offtake tubes and through said condensing tubes.

8. In an acid condenser, an elongated vessel having a closed bottom, a diaphragm mounted in said passage above said bottom, a second diaphragm mounted in said vessel above said first diaphragm, a condensing and distributing substance in the space between said diaphragms, a cover for said vessel, a set of condensing tubes carried by said cover, said condensing tubes each having a closed end to rest on the second mentioned diaphragm and having an open end projected above said cover, a stopper for the open end of each tube, a fluid intake tube projected through said stopper, a fluid offtake tube projected through said stopper, means for causing a circulation of fluid through said intake and offtake tubes and through said condensing tubes, and means for directing or stopping said fluid circulation in a condensing tube in the event that the respective condensing tube becomes broken.

In testimony whereof we have signed our names to this specification in the presence of two subscribing witnesses.

FREDERICK MOORE.
JOHN A. HALL.

Witnesses:
J. WHATLEY ASHLEY,
A. H. WYLLIE.